(No Model.)
R. W. FENWICK.
GLASS TUBE CUTTER.
No. 467,500. Patented Jan. 26, 1892.
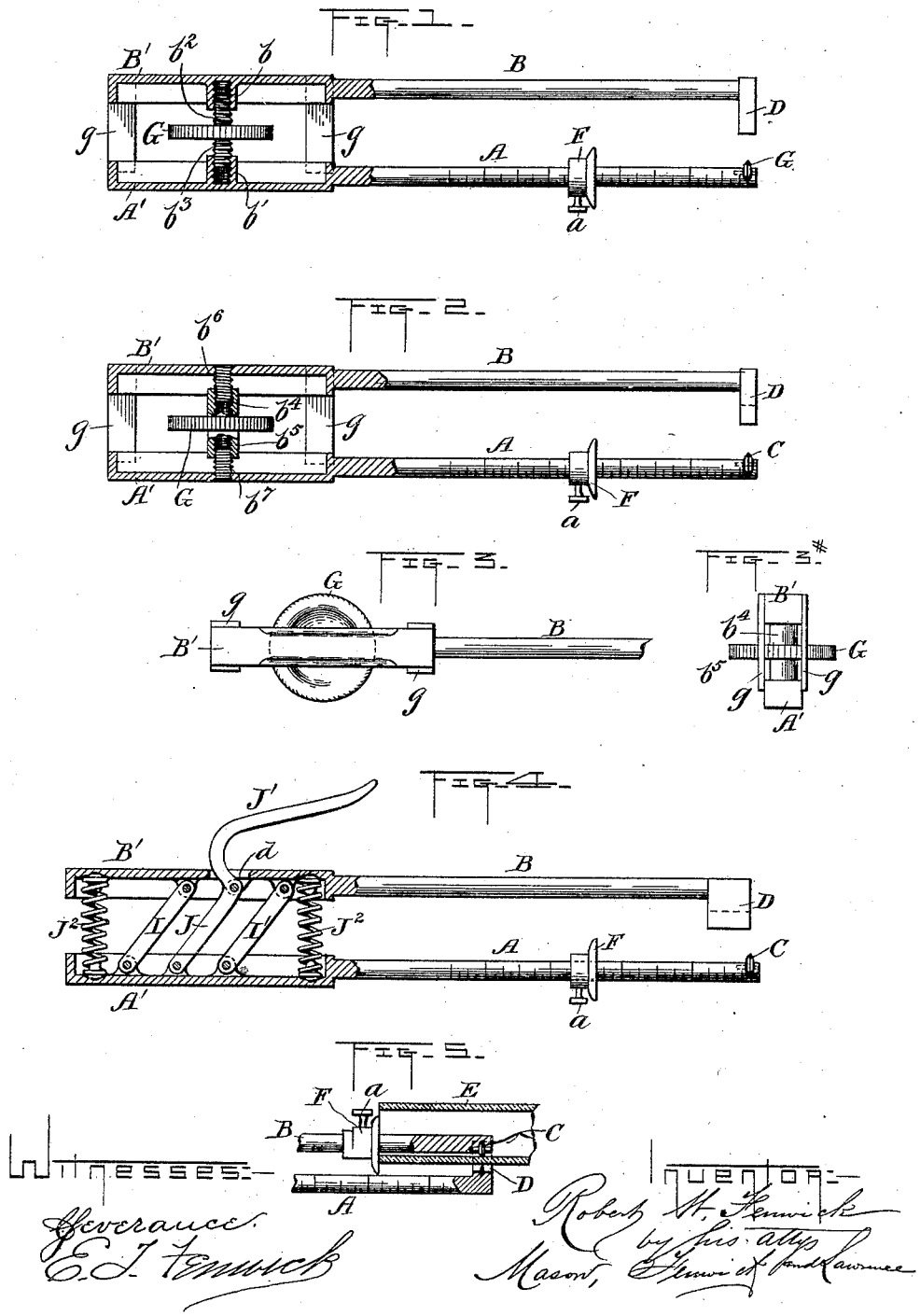

UNITED STATES PATENT OFFICE.

ROBERT W. FENWICK, OF WASHINGTON, DISTRICT OF COLUMBIA, ASSIGNOR TO ALEXANDER E. HUNT, OF SCRANTON, PENNSYLVANIA.

GLASS-TUBE CUTTER.

SPECIFICATION forming part of Letters Patent No. 467,500, dated January 26, 1892.

Application filed March 25, 1891. Serial No. 386,351. (No model.)

*To all whom it may concern:*

Be it known that I, ROBERT W. FENWICK, a citizen of the United States, residing at Washington, in the District of Columbia, have invented certain new and useful Improvements in Glass-Tube Cutters; and I do hereby declare the following to be a full, clear, and exact description of the invention, such as will enable others skilled in the art to which it appertains to make and use the same.

My invention relates to glass-cutters which are carried in and operated by the hand and are used for cutting incisions or determined lines of fracture in glass tubing used in making gages and for other purposes; and it consists in a hand glass-cutting implement comprising two arms carrying, respectively, an incision-cutter, which comes in contact with the glass tubing, and a clamping-piece, which bears against the tubing, said arms being connected at their rear extension ends by novel means, which cause them to approach each other without changing their parallel relation to one another, suitable ordinary means, in connection with the means by which they are moved toward one another, being provided for guiding the arms and keeping them from swaying laterally, steadying them in their movement, and facilitating their return to their normal positions.

My invention also consists, specifically, in a left and right hand screw mechanism, in combination with the two arms carrying, respectively, a cutter and a clamping-piece for effecting the movements of the arms toward one another, as will be hereinafter described.

In the accompanying drawings, Figure 1 is a side elevation and broken sectional view of my improved glass-cutting implement. Fig. 2 is a similar view to Fig. 1, the left and right hand screw mechanism being slightly changed in construction. Fig. 3 is a broken top view of Fig. 1. Fig. 3* is a rear end view of Fig. 2. Fig. 4 is a modification of the means for operating the arms of the glass-cutter; and Fig. 5 is a broken elevation and sectional view showing the arms, a gage-stop, and a piece of glass tubing in operative relation.

A designates the arm which carries the incision-cutter C, and B the arm carrying the clamping-piece D. The clamping-piece is of segmental form, being concaved, so as to bear with its edges on the outside of the glass tubing E, from which glass gage-tubes are to be cut. The cutter may be a revolving-edged disk or a diamond point. On the arm A a stop-gage F is applied, and the same is made adjustable by means of a set-screw $a$ in respect to a scale marked on the arm A, in order to adapt the implement for cutting tubes of different lengths. The rear extension ends B' A' of the arms are constructed, respectively, with a channel on their under and upper surfaces, as shown, and at about the center of the end portions A' B' screw-threaded sockets $b b'$ are provided. The socket $b$ of the arm B has a left-hand or downwardly-drawing screw-thread cut in it, while the socket $b'$ has a right-hand or upwardly-drawing screw-thread cut in it. Into these sockets spindle ends $b^2 b^3$ of a hand wheel or button G are fitted, said ends having, respectively, a left and a right hand screw-thread cut on them. In rear and forward of this screw device flat stay-lugs $g$, or other equivalent means for guiding and staying the arms, are applied on the extension end B' of the arm B, so as to pass down snugly against the outside of the extension end A' of the arm A, as illustrated, and thereby guide the arms A and B in their movements toward and from one another.

Under the construction of glass cutting and incising implement shown in Fig. 1 the clamping-piece B and the cutter C can, by simply turning the button G, be speedily brought toward one another and made to bear with force upon the glass tube E in the manner illustrated in Fig. 5. The left and right hand screw-threads enable the operator to effect the movement in one-half the time that it could be accomplished by a simple single screw-thread. By reversing the movement of the button G the arms can be moved apart very speedily. The lugs $g$ prevent the arms from moving sidewise out of a vertical plane with one another.

The action of the implement shown in Fig. 1 during the cutting of an incision in the glass tubing is similar to other glass-cutting implements heretofore devised—to wit: After its cutter has been entered with the arm A into the tubing and the two arms have been forced together with pressure sufficient to hold the tube in position and maintain the necessary contact of the cutter therewith the tubing is revolved two or three times, so as to effect the cutting of an incision in the glass at right angles to the axis of the tubing, and this done, the pressure is relaxed by turning the screw-button in a reverse direction, the implement withdrawn, and a gentle tap made upon the incised tubing, so as to cause the section of tube to break off from the tubing, thereupon the operation is repeated.

In Fig. 2 the left and right hand screw-threaded spindles $b^2$ $b^3$ (shown in Fig. 1) are attached to the arms A and B, as indicated at $b^6$ $b^7$, and the left and right hand screw-threaded sockets $b$ $b'$ (shown in Fig. 1) are formed in small hubs $b^4$ $b^5$ of the turn-button G. This construction operates substantially the same as the construction shown in Fig. 1.

In Fig. 4 the arms A and B are connected by links I and I' and a lever-link J, the latter link being extended into a hand-lever J', which passes through a slot $d$ in the extension B' of the arm B, and extends above and forward along said arm, as shown. There may be only one link similar to link I, and the link I' may be removed and the lever-link J may be placed and pivoted at the point where the link I' is located.

With the construction shown in Fig. 4 it might be better to have the extension ends B' A' of the arms longer than represented and the links set farther apart. Forward and in rear of the links I I' springs $J^2$ may be applied between the arms for aiding in moving the arms apart when the pressure on the lever J' is relaxed. Under this construction the arms move toward one another parallel, and the cutter and clamping-piece exert their force in a direction at right angles to the axis of the tubing being incised. In order to compensate for the slight forward movement of arm B' and backward movement of arm A' during their approach toward one another, the arm A has its forward end extended slightly in advance of the same end of the arm B, and thus when the movement is accomplished the cutter will stand about central of the length of the clamping-piece and the pressure upon the tubing centralized.

By clasping the implement shown in Fig. 4 in the hand and forcing upon the lever J', the arms will be caused to approach each other and the desired cutting contact with the glass tubing secured, and by relaxing this pressure on the lever the springs will move the arms apart to their normal positions.

I do not claim anything shown and claimed, or that might properly be claimed, in the application of J. Odell Fowler, Jr., filed February 5, 1891, Serial No. 380,388.

What I claim as my invention is—

1. A hand glass-cutter comprising two arms A and B, one carrying an incision-cutter and the other a clamping-piece, said arms being connected by a vertical screw having its axis transversely to the arms and by said screw moved toward each other parallel, substantially as described.

2. A hand glass-cutter comprising two arms A and B, carrying, respectively, a cutter C and clamping-piece D, and having the means by which its arms are moved toward one another parallel connected directly to the upper side of the rear extension of arm A and to the under side of the rear extension of the arm B, substantially as described.

In testimony whereof I hereunto affix my signature in presence of two witnesses.

ROBERT W. FENWICK.

Witnesses:
C. SEVERANCE,
E. T. FENWICK.